United States Patent [19]

Bouldin

[11] Patent Number: 4,802,406
[45] Date of Patent: Feb. 7, 1989

[54] COFFEEMAKER

[76] Inventor: David W. Bouldin, 49 Briar Hollow, Apt. #2003, Houston, Tex. 77027

[21] Appl. No.: 187,956

[22] Filed: Apr. 29, 1988

[51] Int. Cl.⁴ .......................... A47J 31/00; A47J 31/06
[52] U.S. Cl. .......................................... 99/295; 215/6; 215/100 A
[58] Field of Search ................. 99/295, 306, 279, 280, 99/281, 282, 283; 426/433; 215/6, 100 A

[56] References Cited

U.S. PATENT DOCUMENTS

| 4,550,652 | 11/1985 | Silva | 99/295 |
| 4,579,048 | 4/1986 | Stover | 99/295 |
| 4,651,900 | 3/1987 | Horvath | 215/6 |

*Primary Examiner*—Robert W. Jenkins

[57] ABSTRACT

This invention relates to an improved coffee brewing apparatus having a supply of heated water and means for dispensing a predetermined quantity of said heated water at a predetermined time. The invention includes the improvement comprising a grounds basket having divider means for separating the basket into at least two side-by-side compartments. The basket also has means for attaching to the coffee brewing apparatus so as to receive hot water dispensed by the coffee brewing apparatus. Each of the compartments has a brewed coffee outlet in the bottom thereof for passage of the brewed coffee downwardly therethrough by means in the form of a diverter plate are associated with the basket for diverting hot water from the coffee making apparatus uniformly to both sides of the basket, filter means in the form of a saddlebag filter are arranged to be received in the grounds compartment for receiving coffee grounds thereinto. The apparatus also includes a pair of containers removably supported beneath the grounds basket for receiving and collecting two different kinds of brewed coffee simultaneously exiting from the outlets referred to above such that coffee grounds of different quality may be placed in each side of the grounds compartment and two coffees of different qualities may be brewed simultaneously.

4 Claims, 3 Drawing Sheets

COFFEEMAKER

This invention relates to improvements to a conventional relatively small drip-type coffeemaker which, with a minimum change, can be adapted to simultaneously brew two kinds of coffee of different qualities, as, for example, one caffeinated and one decaffeinated coffee. Conventional coffeemakers of this type usually have a bottom rceptacle for receiving the coffee after it has passed through coffee grounds, with the coffee grounds being supported in a filtered container above the receptacle and with a device arranged for passing hot water downwardly through the ground coffee. However, there is a need for a relatively small kitchen appliance, for example, which can produce simultaneously two different kinds of coffee with a minimum of equipment.

It is therefore an object of this invention to provide an improved apparatus for brewing two separate kinds of coffee simultaneously.

Referring now to the drawings.

Figure 7:
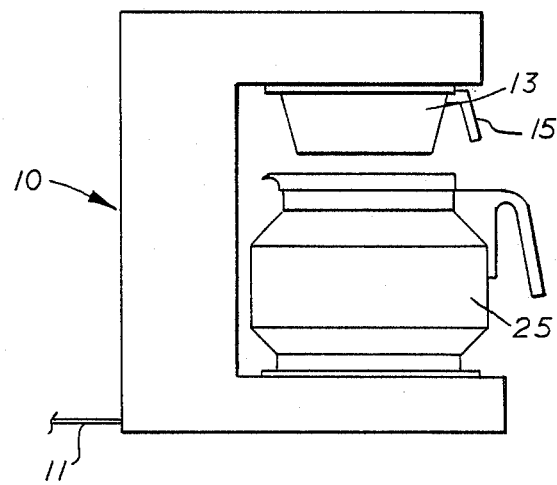

and FIG. 7 is a side elevation view of a conventional home type coffee maker modified by the elements of this invention.

Generally stated, this invention relates to an improved coffee brewing apparatus having a supply of hot water, or means for heating a supply of water to a predetermined temperature, and means for dispensing a predetermined quantity of heated water at a predetermined time, the improvements to which will be described hereinafter.

Referring first to FIG. 7, the numeral 10 designates a conventional home type coffee brewing apparatus to which the present invention constitutes an improvement. It is to be understood that brewing apparatus 10 will have a conventional supply of hot water or a heating reservoir (not shown) where heat is applied by a heating element supplied by electricity through electrical cord 11, all in conventional manner.

The invention includes grounds basket 13 made of heat resistant plastic or the like having a pair of flanges 14 on the upper sides thereof for engaging in matching slots and coffee making apparatus 10 as shown in FIG. 7. Grounds basket 13 is provided with a handle 15 for grasping and manipulating. In addition, grounds basket 13 has a divider wall 16 separating the basket into two compartments for receiving saddlebag type coffee grounds filter 17 made of filter paper or the like which is arranged to receive coffee grounds of two different types simultaneously.

The bottom of each compartment of grounds basket 13 is provided with an exit hole 18 through which brewed coffee descends downwardly therethrough. In addition, the bottoms of each of the compartments in grounds basket 13 is provided with a plurality of guide channels 19 which direct the flow of brewed coffee through exit holes 18.

Grounds basket 13 is arranged to have mounted thereover and carried thereby inwardly sloped fluid distribution plate 20 as shown in FIG. 20 having a raised center 21 and a plurality of circumferentially spaced about distribution holes 22. Distribution plate 20 is arranged for having the hot water dispensed from coffee making apparatus 10 to be received thereon and for distributing the same uniformly through distribution holes 20 to the coffee grounds contained in saddlebag filter 17, such that substantially equal quantities of hot water are distributed to each side of the saddlebag filter 17 for passage downwardly therethrough the coffee grounds and exiting through exit holes 18 in the bottom of grounds basket 13.

Figure 1:
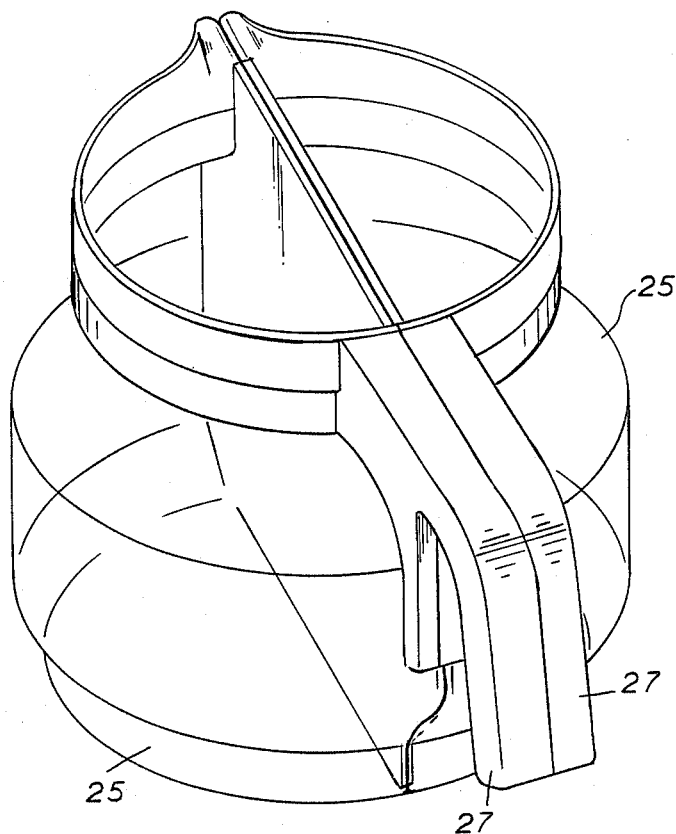
FIG. 1 is an isometric view of a pair of serving containers adapted for simultaneously receiving separate kinds of coffee that are brewed simultaneously.
Figure 2:
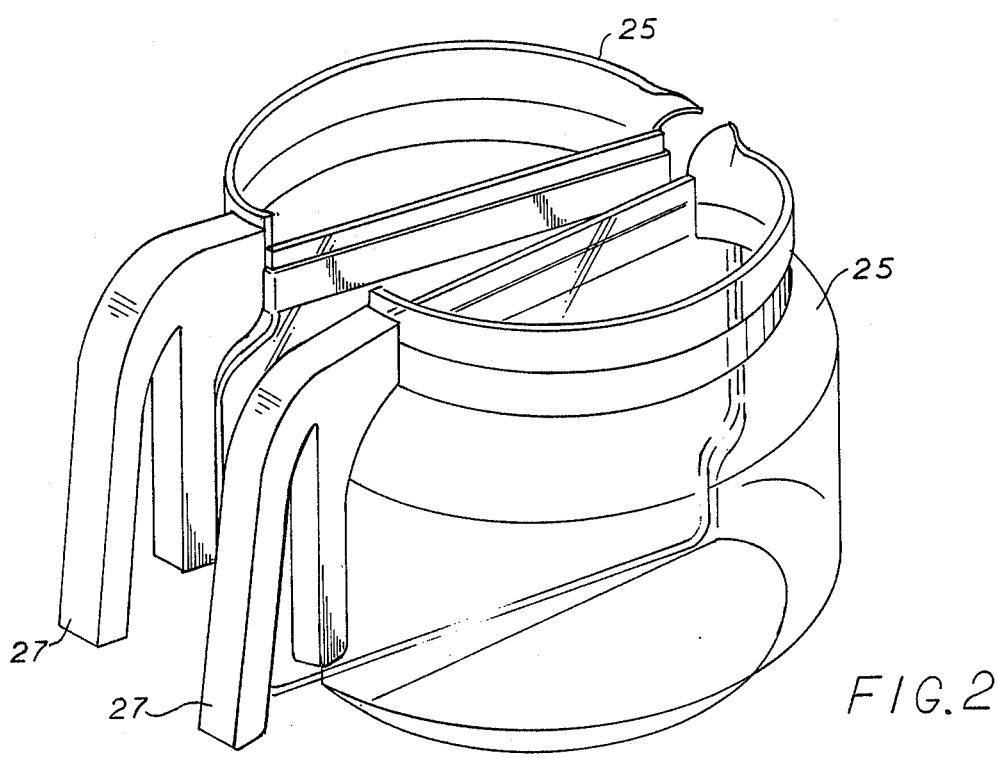
FIG. 2 is a view similar to FIG. 1, but showing the containers separated.
Figure 6:
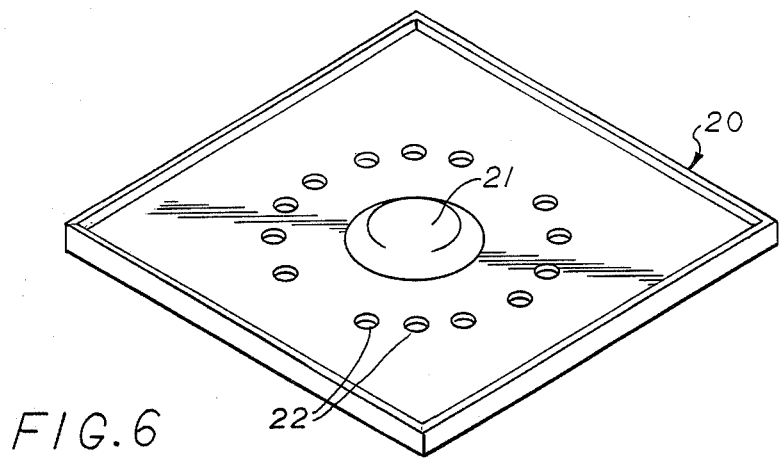
FIG. 6 is an isometric view of a distribution plate arranged to fit in the top part of the basket shown in FIG. 1.

A pair of serving containers are removably supported beneath the grounds basket 13 as shown in FIG. 7 and identified by the numerals 25—25 as shown in FIGS. 1 and 2. Each of containers 25 is provided with a pour spout 26 and a grasping handle 27. Containers 25 may be of heat resistant glass or the like.

Figure 3:
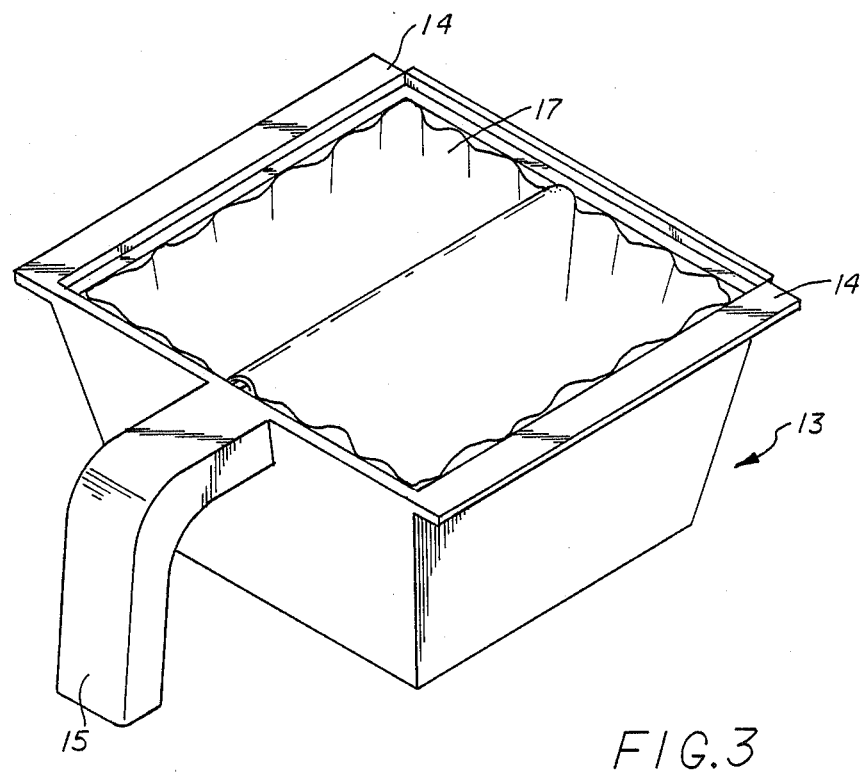
FIG. 3 is a perspective view of a grounds basket for use in connection with the coffee brewing apparatus and having shown mounted therein a saddlebag filter element as will be described hereinafter.
Figure 4:
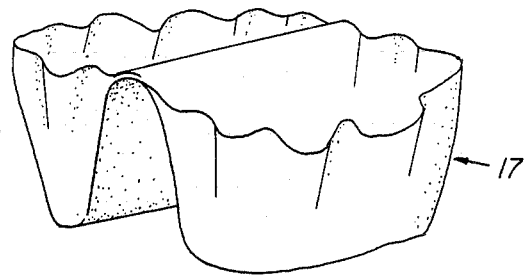
FIG. 4 is an isometric view of saddlebag type coffee grounds filter used in connection with the apparatus.
Figure 5:
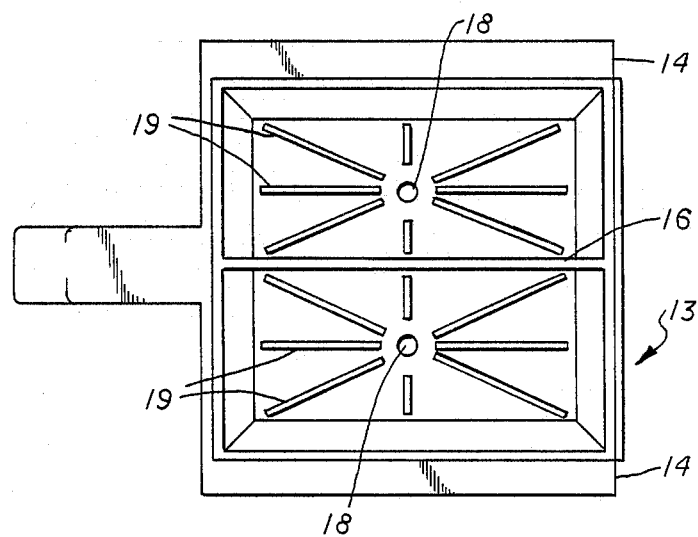
FIG. 5 is a top plan view of the grounds basket shown in FIG. 3.

In operation, a saddlebag coffee grounds filter 17 is mounted in grounds basket 13 as shown in FIG. 3. Thereafter, coffee grounds of two different types, as for example, decaffeinated and regular coffee, are deposited in each compartment of saddlebag filter 17. Thereafter, distribution plate 20 is mounted thereover and ground basket 13 with distribution plate 20 mounted thereon is inserted into the coffee maker apparatus 10 as shown in FIG. 7. In addition, coffee containers 25 are mounted side by side beneath the grounds basket 13 as shown in FIG. 7.

Thereafter, coffee maker apparatus 11 is placed in operation such that when the quantity of water from the water reservoir (not shown) in coffee maker apparatus 10 is heated and ready for dispensing, it passes downwardly onto raised center 21 of distribution plate 20, where the heated water then passes through distribution holes 22 for deposition in both sides of saddlebag filter 17, where the hot water then percolates downwardly through the two different types of coffee. After having passed through the coffee grounds, the brewed coffee exits from grounds basket 13 through exit holes 18 into side by side coffee containers 25 where the same is collected.

By use of this invention, then, two different types of coffee can be simultaneously brewed. It is contemplated that the articles described above, i.e., twin coffee containers 25, the grounds basket 13 with the wall 16 and the saddlebag coffee grounds filter 17 could be substituted in existing coffee makers, as, for example, those coffee makers which have a single center discharge point for the hot water into the coffee receptacle. In certain brands of coffee makers, the heated water is not deposited into the receptacle in a central position, in which case the distribution plate 20 is altered to insure that the heated water is equally divided between the two halves of grounds basket 13.

Further modifications and alternative embodiments of the apparatus of this invention will be apparent to those skilled in the art in view of this description. Accordingly, this description is to be secured as illustrative only and is for the purpose of teaching those skilled in the art the manner of carrying out the invention. It is to be understood that the forms of the invention herewith shown and described are to be taken as the presently preferred embodiments. Various changes may be made in the shape, size and arrangement of parts. For example, equivalent elements or materials may be substituted for those illustrated and described herein, parts may be reversed, and certain features of the invention may be utilized independently of the use of other features, all as would be apparent to one skilled in the art after having the benefit of this description of the invention.

What is claimed is:

1. In an improved coffee brewing apparatus having a supply of heated water and means for dispensing a predetermined quality of said heated water at a predetermined time, the improvement comprising:

a grounds basket having divider means for separating said basket into at least two side by side grounds compartments, said basket having means for attaching to said coffee brewing apparatus so as to receive hot water dispensed by said coffee brewing apparatus, and each of said compartments having a brewed coffee outlet in the bottom thereof for passage of brewed coffee downwardly therethrough;

means associated with said basket for diverting hot water from said coffee making apparatus uniformly to both sides of said basket;

filter means arranged to be received in said grounds compartment for receiving coffee grounds thereinto;

and a pair of containers removably supported beneath said grounds basket for receiving and collecting brewed coffee exiting from said brewed coffee outlets;

whereby coffee grounds of different quality may be placed in each of said grounds compartments and two coffees of different quality may be brewed simultaneously.

2. The invention as claimed in claim 1 wherein said filter means includes a saddle bag shaped filter.

3. The invention as claimed in claim 1 wherein said hot water diverting means includes a diverter plate arranged for mounting over said basket, said plate having a raised center and a plurality of holes spaced circumferentially around said raised portion for dispensing hot water uniformly into both of said grounds compartments.

4. The invention as claimed in claim 1 wherein the bottom of each of said grounds compartments has radically extending channels arranged for channelling brewed coffee to said outlets.

* * * * *